United States Patent
Khan et al.

(10) Patent No.: US 7,031,992 B2
(45) Date of Patent: Apr. 18, 2006

(54) HARDWARE FUNCTION GENERATOR SUPPORT IN A DSP

(75) Inventors: Shoab A. Khan, Rawalpindi (PK); Rehan Hameed, Rancho Santa Margarita, CA (US); Hassan Farooq, Rancho Santa Margarita, CA (US)

(73) Assignee: Quartics, Inc., Irvine, CA (US)

( * ) Notice: Subject to any disclaimer, the term of this patent is extended or adjusted under 35 U.S.C. 154(b) by 527 days.

(21) Appl. No.: 09/951,764

(22) Filed: Sep. 10, 2001

(65) Prior Publication Data
US 2002/0116181 A1    Aug. 22, 2002

Related U.S. Application Data

(60) Provisional application No. 60/231,280, filed on Sep. 8, 2000.

(51) Int. Cl.
*F06F 1/02*    (2006.01)
(52) U.S. Cl. ..................................... 708/276
(58) Field of Classification Search ................ 708/233, 708/276, 270; 712/13
See application file for complete search history.

(56) References Cited

U.S. PATENT DOCUMENTS

| | | | |
|---|---|---|---|
| 4,231,102 A | | 10/1980 | Barr et al. |
| 4,777,613 A | | 10/1988 | Shahan et al. |
| 4,876,640 A | * | 10/1989 | Shankar et al. ............. 708/233 |
| 4,896,287 A | | 1/1990 | O'Donnell et al. |
| 4,937,775 A | | 6/1990 | Engeler et al. |
| 5,187,796 A | * | 2/1993 | Wang et al. ................. 708/520 |
| 5,550,869 A | | 8/1996 | Gurantz et al. |
| 5,619,664 A | * | 4/1997 | Glew ......................... 712/218 |
| 5,684,435 A | | 11/1997 | Bergen |
| 6,011,448 A | | 1/2000 | McCabe et al. |
| 6,035,005 A | | 3/2000 | Bastani et al. |
| 6,175,269 B1 | | 1/2001 | Gielis et al. |
| 6,175,600 B1 | | 1/2001 | Guillemain et al. |
| 6,205,533 B1 | * | 3/2001 | Margolus .................... 712/13 |
| 6,434,582 B1 | * | 8/2002 | Choe et al. ................. 708/276 |

OTHER PUBLICATIONS

Takashi et al., A 6.7-MFLOPS floating-point coprocessor with vector/matrix instructions, Oct. 1989, IEEE JOurnal of solid-state circuits, vol. 24, No. 5, pp. 1324-1330.*

* cited by examiner

*Primary Examiner*—Kakali Chaki
*Assistant Examiner*—Chat C. Do
(74) *Attorney, Agent, or Firm*—Patent Metrix

(57) ABSTRACT

The present invention relates to digital signal processors with an integrated module configured to compute a Coordinate Rotation Digital Computer (CORDIC) in a pipeline. The pipelined module can advantageously complete computation of one CORDIC computation for each clock pulse applied to the CORDIC module, thereby providing a CORDIC computation for each clock pulse. One embodiment advantageously computes a first portion of a computation with a lookup table and a second portion in accordance with a CORDIC algorithm. Advantageously, data in a CORDIC pipeline is automatically advanced in response to read instructions and can be automatically advanced from the beginning of the pipeline to the end of the pipeline to reinitialize the pipeline. This allows information to be retrieved from the CORDIC pipeline with relatively little overhead. The automatic starting and stopping of the CORDIC pipeline advantageously allows the retrieval of computations from efficient pipeline architectures on an as-needed basis.

4 Claims, 5 Drawing Sheets

HARDWARE FUNCTION GENERATOR SUPPORT IN A DSP

RELATED APPLICATION

This application claims the benefit under 35 U.S.C. § 119(e) of U.S. Provisional Application No. 60/231,280, filed Sep. 8, 2000, the entirety of which is hereby incorporated by reference.

BACKGROUND OF THE INVENTION

1. Field of the Invention

The present invention generally relates to digital signal processing. In particular, the present invention relates to a Coordinate Rotation Digital Computer (CORDIC) in a digital signal processor (DSP).

2. Description of the Related Art

A Coordinate Rotation Digital Computer (CORDIC) algorithm performs vector coordinate rotations by using simple iterative shifts and add/subtract operations, which are relatively easy to implement in hardware. Advantages of the CORDIC algorithm have been well documented by U.S. Pat. No. 4,896,287 to O'Donnell, et al., U.S. Pat. No. 4,937,775 to Engeler, et al., and U.S. Pat. No. 5,684,435 to Bergen, the entireties of which are hereby incorporated by reference.

The CORDIC algorithm can be used in function generators. Function generators are an integral part of many DSP algorithms. Digital communication and signal processing systems use representations of sine, cosine, tangent and hyperbolic functions to perform fundamental operations such as coherent detection, rectangular to polar conversions, decoding of Quadrature Amplitude Modulation (QAM) and M-ARY modulated signals, and the like. In addition, the CORDIC algorithm can be used in Direct Digital Synthesis (DDS) of frequencies.

One conventional technique to generate trigonometric functions is via a lookup table stored in a Read Only Memory (ROM). Disadvantageously, the amount of data that is stored in a ROM lookup table can quickly surpass practical size and cost limitations. The storage area of a ROM chip increases almost exponentially with increases in resolution. By contrast, where a ROM lookup table is relatively small and inexpensive, the number of available functions and the resolution of the data available are limited.

Another conventional technique is to compute trigonometric functions through polynomial software routines executed in a digital signal processor (DSP). Disadvantageously, typical software implementations of function generation are relatively slow. Typical software routines use iterative techniques, and take relatively time consuming multiple cycles to generate a trigonometric function.

Function generation can be performed by a CORDIC. However, many conventional implementations of a CORDIC iterate numerous times to perform a calculation for function generation. Thus, a microprocessor or DSP reading the output of the CORDIC waits until computation is complete. Where a conventional CORDIC is pipelined, execution can be faster, but conventional pipelined CORDICs have relatively little integration with other hardware. Disadvantageously, other hardware, such as microprocessors and DSPs, closely monitor or control conventional pipelined CORDICs or store the results of the conventional pipelined CORDIC in relatively large and expensive memory devices.

SUMMARY OF THE INVENTION

Embodiments of the invention quickly and efficiently process the CORDIC algorithm in a pipeline. Advantageously, data in the CORDIC pipeline is automatically advanced in response to read instructions and can be automatically advanced from the beginning of the pipeline to the end of the pipeline to reinitialize the pipeline. This allows a controller or a digital signal processor (DSP) to efficiently retrieve information from the CORDIC pipeline with relatively little overhead. The automatic starting and stopping of the CORDIC pipeline advantageously allows the retrieval of computations from efficient pipeline architectures on an as-needed basis and advantageously avoids having to store relatively large amounts of computations from a pipeline in memory.

One embodiment of the present invention includes a design of a modified CORDIC Function Generator that can be used in a DSP core. The modified CORDIC Function Generator is pipelined to provide a new output on every clock edge. A relatively small initial latency allows the modified CORDIC Function Generator time to process new data through the pipeline.

In one embodiment, an architecture for an Execution Block, which can be implemented in the DSP core, advantageously uses the CORDIC Function Generator to reduce both chip area and DSP idle cycles. An example of a Radix-2 butterfly illustrates how this CORDIC Function Generator improves the implementation of such DSP algorithms.

One embodiment according to the invention includes a method of computing correlation in a digital signal processor (DSP). The method includes receiving receiver data in quadrature, digitally generating a sine wave and a cosine wave with a pipelined Coordinate Rotation Digital Computer (CORDIC), and multiplying the receiver data by the first portion of the sine wave and the first portion of the cosine wave in a Multiplier Accumulator (MAC) block to determine an amount of correlation. In one embodiment, the sine wave and the cosine wave generated by the CORDIC algorithm are of substantially constant magnitude.

Another embodiment according to the invention is a method of digitally generating a sine wave and a cosine wave. The method includes (a) receiving an angle increment value, where the angle increment value is related to a change in an angle by which the sine wave and the cosine wave change during a time increment, (b) computing a new angle value by combining the angle increment value with an existing angle value, (c) calculating a sine and a cosine of the new angle value to compute a value of a step of the sine wave and a value of a step of the cosine wave, respectively, (d) maintaining the computed values of the steps of the sine wave and of the cosine wave such that the values are ready to be read upon receipt of a read instruction, (e) performing the following when a read instruction has been received, (e)(i) providing the computed values of the steps of the sine wave and of the cosine wave in response to a receipt of the read instruction, (e)(ii) storing the new angle value as the existing angle value, (e)(iii) computing another value for the new angle value by combining the angle increment value with the existing angle value, (f) inhibiting further computations of values of other steps of the sine wave and of the cosine wave when a read instruction has not been received, and (g) repeating steps (b), (c), (d), (e), and (f).

One embodiment of the invention includes a method of generating a digital sine wave and a digital cosine wave in a digital signal processor (DSP). The method includes computing a portion of the sine wave and a portion of the cosine wave by looking up points in a lookup table, and computing a remaining portion of the sine wave and the cosine wave in accordance with a pipelined CORDIC.

One embodiment of the invention includes a method of providing an intermittent clock signal to a pipelined process. The intermittent clock signal automatically advances and stops advancing computations in the pipelined process in accordance with the rate at which data is retrieved from the pipelined process. The method includes receiving a system clock signal and generating clock pulses of the intermittent clock signal from the system clock signal for a predetermined period after decoding of a first instruction received in a DSP. The first instruction can correspond to a start instruction. The method further includes inhibiting clock pulses of the intermittent clock signal after termination of the predetermined period and providing a clock pulse of the intermittent clock signal from the system clock signal in response to a decoding of a second instruction. The second instruction can be a read instruction. In one embodiment, the predetermined period is the latency of a pipeline from beginning to end.

One embodiment according to the invention includes a method of generating a function in a digital signal processor (DSP). The method includes receiving a first instruction, such as a start instruction, which initiates a computation according to a Coordinate Rotation Digital Computer (CORDIC) algorithm. The method computes the CORDIC algorithm in a pipeline and automatically discontines further computations of the CORDIC algorithm in the pipeline when a computed output is ready. The method provides the computed output of the CORDIC algorithm in response to a second instruction such as a read instruction.

One embodiment of the invention is a process of controlling a pipelined circuit with a read instruction. The process includes receiving a plurality of instructions and detecting the occurrence of the read instruction. In response to the detection of the read instruction, the process advances computations through one stage or segment of the pipelined circuit and generates an output of the pipelined circuit.

One embodiment of the invention is a process that includes detecting a start instruction, which loads the beginning of the pipelined circuit and automatically sequences the stages of the pipelined circuit until new data is ready to be read at the output. Where the received instruction does not correspond to the read instruction or to the start instruction, one embodiment of the invention pauses the pipelined circuit.

One embodiment of the invention includes a DSP that includes a CORDIC unit, a register file, and at least one of a Multiplier Accumulator (MAC), an Arithmetic Logic Unit (ALU), and a Shifter. The CORDIC computes steps of sine waves and cosine waves. The register file provides arguments to the CORDIC unit and the at least one of the MAC, the ALU, and the Shifter.

One embodiment of the invention is a CORDIC that includes a plurality of computation stages arranged in a pipeline, a reset unit, an output circuit, and a timing circuit. The reset unit is adapted to receive a reset instruction and to reset the plurality of computation stages in response to the reset instruction. The output circuit is adapted to provide a computation from the plurality of computation stages in the pipeline in response to read computation instruction. The timing circuit is adapted to advance calculations through the pipeline in response to a start instruction. The timing circuit is further configured to automatically discontinue advancing the calculations through the pipeline when a calculation has progressed to an end of the pipeline, and the timing circuit is further configured to generate another computation in response to the read CORDIC instruction.

One embodiment according to the invention includes a control circuit for a pipelined CORDIC. The control circuit can also be used to control other pipelined circuits. The control circuit includes a reset circuit, a first sequencing unit, and a second sequencing unit. The reset circuit is adapted to reset at least a portion of the pipelined stages of the pipelined CORDIC. The first sequencing unit is adapted to automatically enable clock pulses to the pipelined CORDIC such that a new calculation can progress from a beginning of the pipelined CORDIC to an end of the pipelined CORDIC. The first sequencing unit is also configured to automatically disable the automatic application of clock pulses to the pipelined CORDIC when the computation is available at the end of the pipelined CORDIC. The second sequencing unit is adapted to provide a clock pulse to the pipelined CORDIC to advance a calculation from one stage to another, where the second sequencing unit is configured to provide the clock pulse in response to an instruction to read an output of the pipelined CORDIC.

BRIEF DESCRIPTION OF THE DRAWINGS

These and other features of the invention will now be described with reference to the drawings summarized below. These drawings and the associated description are provided to illustrate preferred embodiments of the invention, and are not intended to limit the scope of the invention.

DETAILED DESCRIPTION OF THE PREFERRED EMBODIMENTS

Figure 1:
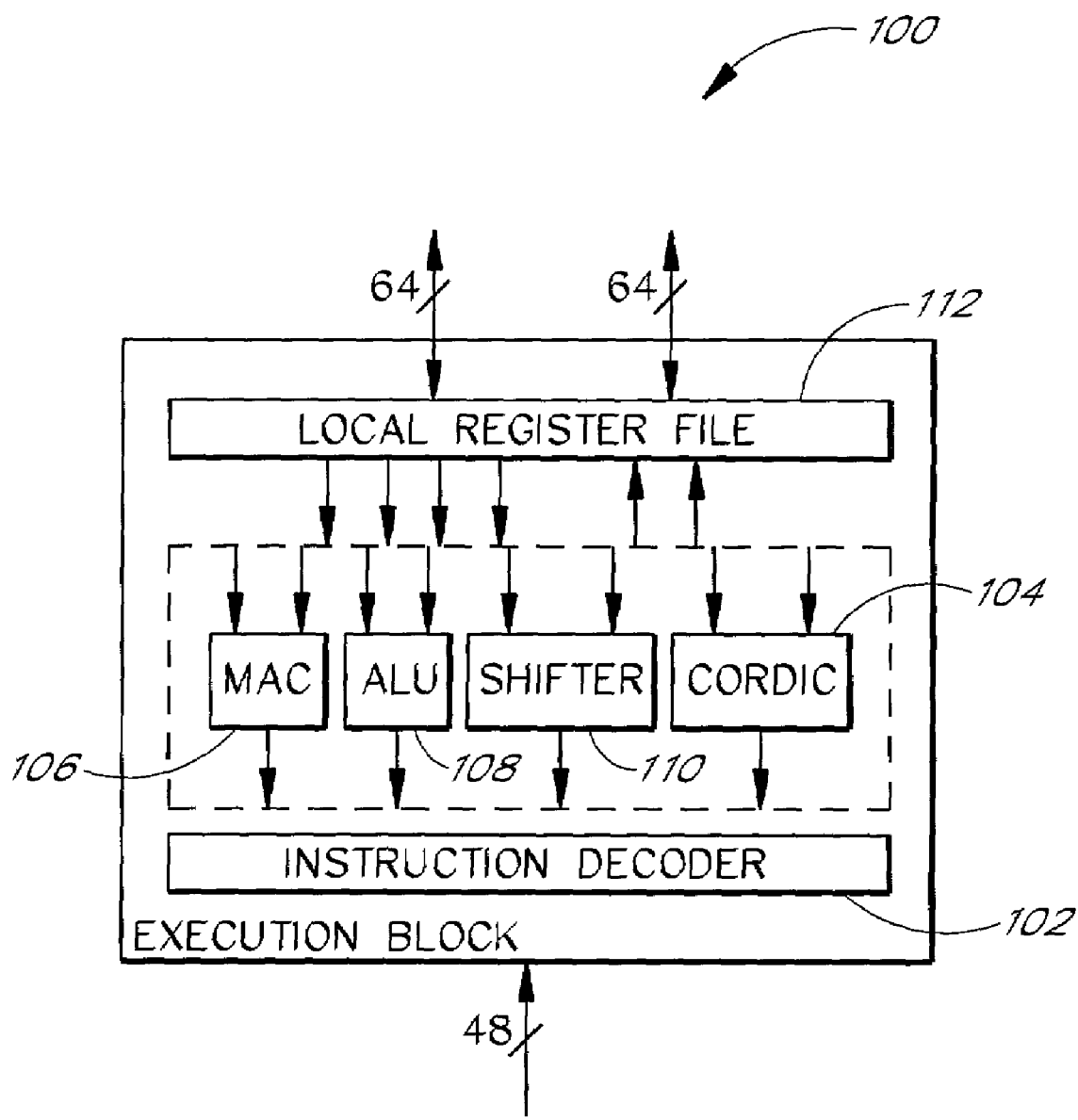
FIG. 1 illustrates an execution block according to an embodiment of the invention.

Although this invention is described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

One use of a Coordinate Rotation Digital Computer (CORDIC) algorithm is to generate functions such as trigonometric, logarithmic, hyperbolic and linear functions. Another use of the CORDIC algorithm is to convert between Polar and Cartesian coordinates. The CORDIC algorithm performs vector coordinate rotations using simple iterative shifts and add/subtract operations. The general (Givens') rotation transform expressed in Equations 1A and 1B rotates a vector by an angle $\phi$.

$$x' = x \cos \phi - y \sin \phi$$

$$y' = y \cos \phi + x \sin \phi \qquad \text{Eqs. 1A and 1B}$$

The transform can be rearranged as shown in Equations 2A and 2B.

$$x' = \cos\phi[x - y\tan\phi]$$

$$y' = \cos\phi[y + x\tan\phi] \quad \text{Eqs. 2A and 2B}$$

The rotation angle $\phi$ can be selected such that $\tan(\phi) = \pm 2^{-i}$, i.e., powers of two, which can be implemented by shift operations. An overall rotation angle can be reached by applying successively smaller rotations. At each iteration, i, the direction of rotation is decided. This further simplifies Equations 2A and 2B to Equations 3A and 3B.

$$x_{i+1} = k_i[x_i - y_i 2^{-i}\sigma_i]$$
$$y_{i+1} = k_i[y_i - x_i 2^{-i}\sigma_i] \quad \text{Eqs. 3A and 3B}$$

where:

$$k_i = \frac{1}{\sqrt{1 + 2^{-2i}}}$$

$$\sigma_i \in \{-1, 1\}$$

Since, $k_i$ is a constant multiplier that affects magnitude, $k_i$ can be pre-calculated and easily compensated. Equation 4 illustrates the accumulation in the rotation angles at each iteration.

$$z_{i+1} = z_i - \sigma_i \tan^{-1}(2^{-i}) \quad \text{Eq. 4}$$

Conventionally, the values of $\tan^{-1}(2^{-i})$ are stored in a relatively small Read Only Memory (ROM) lookup table (LUT). The CORDIC algorithm can be applied in rotation mode or in vectoring mode. The rotation mode rotates the input vector by the angle specified through $z_0$. Successive iterations rotate in the direction to attempt to reduce this angle $z_i$. Therefore, the direction to rotate is dependent on $z_i$ and is expressed as Equation 5.

$$\sigma_i = \begin{cases} 1 & z_i \geq 0 \\ -1 & z_i < 0 \end{cases} \quad \text{Eq. 5}$$

The vectoring mode rotates the input vector through an angle such that the resulting vector lies on the x-axis. Successive iterations rotate in the direction to reduce the y-component, $y_i$. Therefore, the direction to rotate is dependent on $y_i$ and is expressed as Equation 6.

$$\sigma_i = \begin{cases} 1 & y_i < 0 \\ -1 & y_i \geq 0 \end{cases} \quad \text{Eq. 6}$$

The initial values of the system variables, $x_0$, $y_0$, and $z_0$ determine the function computed. Examples of uses for the vectoring mode include Cartesian to Polar conversion, calculation of arctangents, and calculation of vector magnitude.

Generally, if the CORDIC algorithm can compute a function, the inverse of the function can also be computed. The CORDIC equations can be modified to introduce a coordinate system factor, m. The coordinate systems are hyperbolic (m=1), linear (m=0) and circular (m=−1). These extensions allow the CORDIC algorithm to compute linear and hyperbolic functions.

One implementation of the CORDIC algorithm uses comparators for each stage to determine the direction of rotation. A modified CORDIC algorithm for Direct Digital Frequency Synthesis (DDFS) or DDS simplifies a CORDIC computation by determining the direction of rotation directly from the bits $r_k$ representing the angle $\phi$, as shown in Equation 7.

$$r_k = \begin{cases} 1 & bit = 1 \\ -1 & bit = 0 \end{cases} \quad \text{Eq. 7}$$

The modified CORDIC algorithm uses $\phi = 2^{-i}$ instead of $\phi = \tan^{-1}(2^{-i})$ as subangles. This modifies the standard CORDIC equations to the equations expressed in Equations 8A–D.

$$x_{i+1} = k_i[x_i - y_i \tan(2^{-i})]$$
$$y_{i+1} = k_i[y_i - x_i \tan(2^{-i})] \bigg\} r_k = 1 \quad \text{Eqs. 8A, 8B, 8C, and 8D}$$

$$x_{i+1} = k_i[x_i + y_i \tan(2^{-i})]$$
$$y_{i+1} = k_i[y_i + x_i \tan(2^{-i})] \bigg\} r_k = -1$$

Table 1 illustrates that the values of $\tan(2^{-i})$ and $2^{-i}$ are similar for values of i>(WordLength/3). The similarity can simplify the hardware to relatively simple hardwired shifts for values of i>(WordLength/3). In one embodiment, the first (WordLength/3) stages are merged together and implemented with ROM.

TABLE 1

| i | $2^{-i}$ | $\tan 2^{-i}$ | $2^{-i}$ (20-bit hex) | $\tan 2^{-i}$ (20-bit hex) |
|---|---|---|---|---|
| 1 | 0.5000 | 0.5463 | 0x40000 | 0x45ED4 |
| 2 | 0.2500 | 0.2533 | 0x20000 | 0x20AF0 |
| 3 | 0.1250 | 0.1257 | 0x10000 | 0x10157 |
| 4 | 0.0625 | 0.0629 | 0x08000 | 0x0802A |
| 5 | 0.0312 | 0.0313 | 0x04000 | 0x04005 |
| 6 | 0.0156 | 0.0156 | 0x02000 | 0x02000 |
| 7 | 0.0078 | 0.0078 | 0x01000 | 0x01000 |
| 8 | 0.0039 | 0.0039 | 0x00800 | 0x00800 |
| 9 | 0.0020 | 0.0020 | 0x00400 | 0x00400 |
| 10 | 0.0001 | 0.0001 | 0x00200 | 0x00200 |

FIG. 1 illustrates an Execution Block 100 of a DSP with a CORDIC Assist 104 according to an embodiment of the invention. The CORDIC Assist 104 is pipelined such that a function generated output, such as a sine/cosine output, is available at every clock cycle of the CORDIC Assist 104. The Execution Block 100 further includes an Instruction Decoder 102 and a Local Register File 112. The Execution Block 100 can further include other DSP functional units typical of a DSP, such as a Multiplier Accumulator MAC) 106, an Arithmetic Logic Unit (ALU) 108, and a Shifter 110. In the illustrated embodiment, the CORDIC Assist 104 shares the Local Register File 112 and the Instruction Decoder 102 with the other DSP functional units.

In one embodiment, the core of the DSP has a scalable and configurable architecture, which allows the designer to plug-in a variety of functional units without changing the external interfaces of the block with the rest of the core. The Instruction Decoder 102 can be centralized or distributed. In one embodiment, the Instruction Decoder 102 is distributed, and a program sequencer of the core dispatches instructions to multiple execution blocks. The dispatched instructions are then decoded by the distributed instruction decoders of the specific blocks.

In one embodiment, a function generation process, such as sine/cosine generation, is initiated early. In one embodiment, the function generation process is initiated early by approximately the amount of time equal to the initial latency of the pipelined process, such that an output of the function generation process is available in response to a read instruction.

In one embodiment, the Execution Block 100 can execute two instructions per cycle. Thus, the Execution Block 100 includes multiple read ports available from the Local Register File 112. However, it will be understood by one of ordinary skill in the art that other embodiments of the Execution Block 100 according to the invention can execute a wide variety of instructions per cycle, and can even include multiple cycles per instruction.

In one embodiment, the CORDIC Assist 104 responds to at least two specific instructions. These instructions are a startCORDIC instruction and a readCORDIC instruction. In one embodiment, the startCORDIC instruction passes two parameters to the CORDIC Assist 104. These parameters are an initial phase angle and an increment value.

After initial latency cycles, which vary depending on the number of stages or segments of the pipeline, the result of the first computation progresses through the stages or segments of the pipelined CORDIC Assist 104 and to the output of the CORDIC Assist 104. In one embodiment, the result of the CORDIC computation is not automatically written to a register file in the Local Register File 112. Rather, the computed result is retained until an explicit read instruction, e.g., a readCORDIC instruction, is applied to the CORDIC Assist 104, which then transfers the computed result to a register in the Local Register File 112. The following sequence of instructions further illustrates how to use the CORDIC Assist 104.

```
n:   startCORDIC (R1, R2)
n+1: <instr>, <instr>
n+2: <instr>, <instr>
n+3: <instr>, <instr>
n+4: <instr>, <instr>
n+5: readCORDIC(R4)
```

In the sample instructions shown above, an initial angle is specified in R1, and the increment in angle is specified in R2. In the illustrated embodiment, the sine and the cosine values of initial angle are ready in cycle n+5 and are available to be read in cycle n+5 or a later cycle, i.e., the number of latency cycles is 5. In the illustrated embodiment, the sine and the cosine of the next value (R1+R2) are immediately available to be read in the next cycle after the readCORDIC instruction is applied. Another sample sequence of instructions is provided below:

```
n+6:  readCORDIC (R4); sin/cos (R1 + R2)
n+7:  readCORDIC (R6); sin/cos (R1+ 2 * R2)
n+8:  <instr>
n+9:  <instr>
n+10: readCORDIC (R4) ; sin/cos (R1+3* R2)
```

In one embodiment, the CORDIC Assist 104 also supports a register-interlocking mechanism, which stalls the pipeline if the user, DSP, controller, and the like, issues the first readCORDIC instruction before the end of the initial latency cycles. In one embodiment, if a startCORDIC instruction is issued after a subsequent startCORDIC instruction, then the second instruction result is received at the output.

The CORDIC Assist 104 can further be configured to respond to a resetCORDIC instruction. In one embodiment, the resetCORDIC instruction initializes the stages or segments in the CORDIC Assist 104 that are computed such as CORDIC stages, but does not reset a stage where data is merely retrieved, as in a ROM lookup table.

Figure 2:
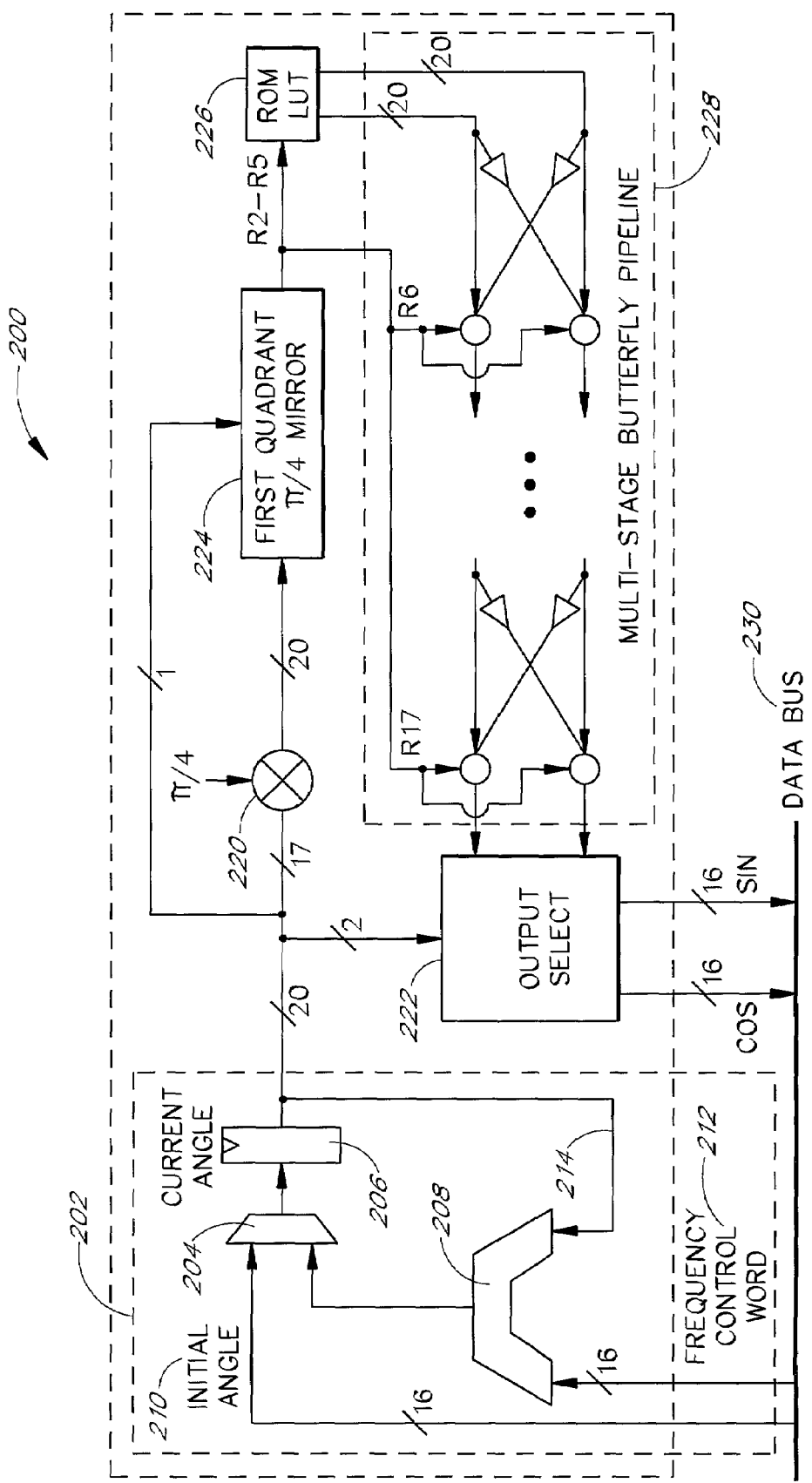
FIG. 2 illustrates a pipelined sine/cosine generation unit according to an embodiment of the invention.

FIG. 2 illustrates a pipelined sine/cosine generation unit 200 according to an embodiment of the invention. The architecture of the illustrated pipelined sine/cosine generation unit 200 advantageously incorporates the instruction based control of the CORDIC Assist 104 described earlier in connection with FIG. 1.

The pipelined sine/cosine generation unit 200 includes an accumulator 202, a $\pi/4$ multiplier 220, an Output Select unit 222, a first quadrant $\pi/4$ mirror 224, a Read Only Memory (ROM) Lookup Table (LUT) 226, and a multi-stage butterfly pipeline 228.

The accumulator 202 generates the angle value for which the remaining portions of the pipelined sine/cosine generation unit 200 compute the sine function and cosine function. In the illustrated embodiment, the accumulator 202 includes a multiplexer 204, a data register 206, and an adder 208. An initial angle 210, i.e., the starting angle, is provided as an input to the multiplexer 204. When the pipelined sine/cosine generation unit 200 begins to process the sine function and the cosine function of the initial angle 210, the multiplexer 204 is configured to select the initial angle 210 and to pass the initial angle 210 as an input to the data register 206, which latches the state of the initial angle 210. In one embodiment, the initial angle 210 is loaded into the data register 206 through a data bus 230. An output 214 of the data register 206, which contains the angle that enters the first stage of the computational stages, is provided as an input to the $\pi/4$ multiplier 220, the Output Select unit 222, and the first quadrant $\pi/4$ mirror 224.

The output 214 of the data register 206 is also provided as an input to the adder 208. The adder 208 forms part of a feedback path that increments the angle output of the data register 206. The adder 208 sums the output 214 of the data register 206 with a frequency control word 212. In one embodiment, the frequency control word 212 is stored in a register that is loaded through the data bus 230, and the frequency control word from the register is provided as an input to the adder 208. The value of the frequency control word determines an amount of increment to the angle, i.e., determines the step size of the angle. The adder 208 sums the frequency control word 212 with the output 214 of the data register 206, and provides the sum as an input to the multiplexer 204.

The multiplexer 204 is configured to select the summed output of the adder 208 when the accumulator 202 is stepping the angle. The output of the multiplexer 204 is provided as an input to the data register 206. When the data register 206 is triggered or re-latched, the data register latches the output of the multiplexer 204, and the output 214 of the data register has incremented by the amount of the frequency control word. The output 214 of the data register 206 is again applied to the adder 208, thereby allowing the accumulator 202 to continue to increment the angle provided by the output 214 of the data register 206.

Due to the symmetry of sine and cosine waves, the cosines and sines of an entire 360-degree range need not be computed. Rather, a more limited range, such as 45 degrees or 90 degrees, can be computed, and the computed sines and cosines can be inverted and/or swapped to rotate the computed result by, for example, a multiple of 90 degrees. In one embodiment, the output 214 of the data register 206 containing the angle is provided with 20 bits of precision. In one embodiment, the two most significant bits of the output 214 of the data register 206 are provided as inputs to the Output Select unit 222. The two most significant bits indicate the quadrant of the angle. The Output Select unit 222 inverts and swaps the output of the multi-stage butterfly pipeline 228 to rotate the cosine and sine computations of the multi-stage butterfly pipeline 228 to their original quadrant.

The output 214 of the accumulator 202 is a normalized angle φ which is converted to an actual radian value φ[0, π/4]. In one embodiment, the output 214 of the accumulator 202 is provided as an input to the hardwired π/4 multiplier 220, which converts the normalized angle φ to radians. In one embodiment, the hardwired π/4 multiplier 220 generates five partial products to achieve more than 16 bits of precision.

In the illustrated embodiment, an output of the hardwired π/4 multiplier 220 is provided as an input to the first Quadrant π/4 mirror 224. In one embodiment, the first Quadrant π/4 mirror 224 is a subtractor that replaces the angle φ as [0, π/4] by [π/2−φ] whenever the original phase accumulation angle θ, i.e., the output of the hardwired π/4 multiplier 220, is in the upper half of the first quadrant. In one embodiment, a third most significant bit of the output 214 of the data register 206, which is illustrated in FIG. 2 by a one-bit wide signal from the data register 206 to the first Quadrant π/4 mirror 224, indicates whether the rotated angle is in the upper half or the lower half of the first quadrant.

To achieve 16 bits of output precision, one embodiment of the pipelined sine/cosine generation unit 200 includes 16 butterfly stages. In the illustrated embodiment, the pipelined sine/cosine generation unit 200 substitutes the first four stages of the pipeline with a Read Only Memory (ROM) Lookup Table (LUT) 226 and implements the next twelve pipelined stages by cascading 12 butterfly stages in the multi-stage butterfly pipeline 228. In one embodiment, the ROM LUT 226 includes 16 words of data. Table II illustrates one example of the contents of the ROM LUT 226.

TABLE II

| x | y |
|---|---|
| 32745 | 1027 |
| 32617 | 3069 |
| 32363 | 5099 |
| 31983 | 7109 |
| 31473 | 9095 |
| 30845 | 11041 |
| 30096 | 12946 |
| 29230 | 14798 |
| 28245 | 16599 |
| 27155 | 18329 |
| 25957 | 19990 |
| 24659 | 21570 |
| 23261 | 23071 |
| 21777 | 24477 |
| 20205 | 25789 |
| 18557 | 26999 |

The outputs of the multi-stage butterfly pipeline 228 is provided as an input to the Output Select unit 222. After the Output Select unit 222 rotates the outputs of the multi-stage butterfly pipeline 228 as dictated by indication of the original quadrant of the angle that is provided by the most significant bits of the output 214 of the data register 206.

The sample code, below, is written in an assembly language for a DSP core. The "||" to the left of a line of code indicates an instruction that can execute in parallel with the prior instruction. The sample code illustrates how the pipelined sine/cosine generation unit 200 can simplify and accelerate an operation, such as a computation of a Fast Fourier Transform (FFT), in a DSP. The following sample code corresponds to a 16-point FFT implemented by a radix-2 butterfly.

```
        // initial setup phase
           N = 16;
           k = 0;
           Ns = N>>1;
           ar0 = d[k]
||         ar1 = d[k+Ns];
           ar2 = store_buffer_address:
           StartCORDIC(r10,r11);
        for Ns repeat
        {
           r0I = *ar0
||         r2I = *ar1;
           r4 = add2(r0,r2);
           *ar2++ = r4I
||         r6 = sub2(r0,r2)
||         readCORDIC(r10,r11);
           r12 = DMAC(r6,r10);
           r13 = iDMAC(r6,r10);
           *ar3 = r12I;
        }
```

Figure 3:
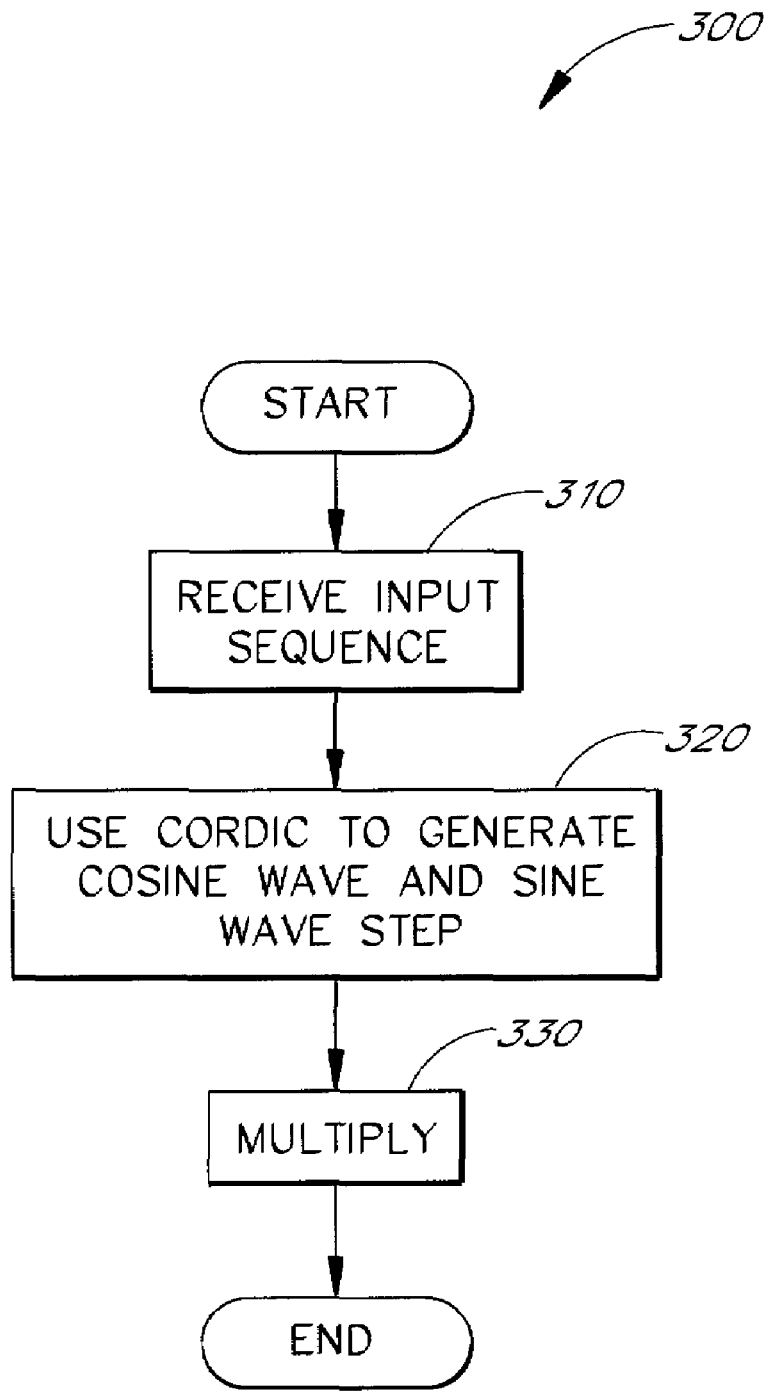
FIG. 3 illustrates a process of quadrature modulation/demodulation with the pipelined sine/cosine according to an embodiment of the invention.

FIG. 3 illustrates a process 300 of quadrature modulation/demodulation with a pipelined sine/cosine generatoraccording to an embodiment of the invention. In a first step 310, the process receives data from an input sequence. In one embodiment, the data is from a receiver. The data can be initially stored in a memory device and received by the process later in non real time. The process advances from the first step 310 to a second step 320.

In the second step 320, the process generates values for a step of a cosine wave and a step of a sine wave. In one embodiment, the process computes the values of the cosine wave and the sine wave by computing the cosine function and the sine function in a pipelined CORDIC function generator. Advantageously, a pipelined CORDIC Function Generator can generate steps of the cosine wave and the sine wave with relatively little latency and without having to generate or store a relatively large lookup table. In one embodiment, the pipelined CORDIC automatically starts and stops as described earlier in connection with FIG. 2. The process advances from the second step 320 to a third step 330.

In the third step 330, the process multiplies the cosine wave and sine wave outputs of the pipelined CORDIC Function Generator with the received data to generate in-phase (cosine) or the quadrature-phase (sine) modulated or demodulated products.

Figure 4:
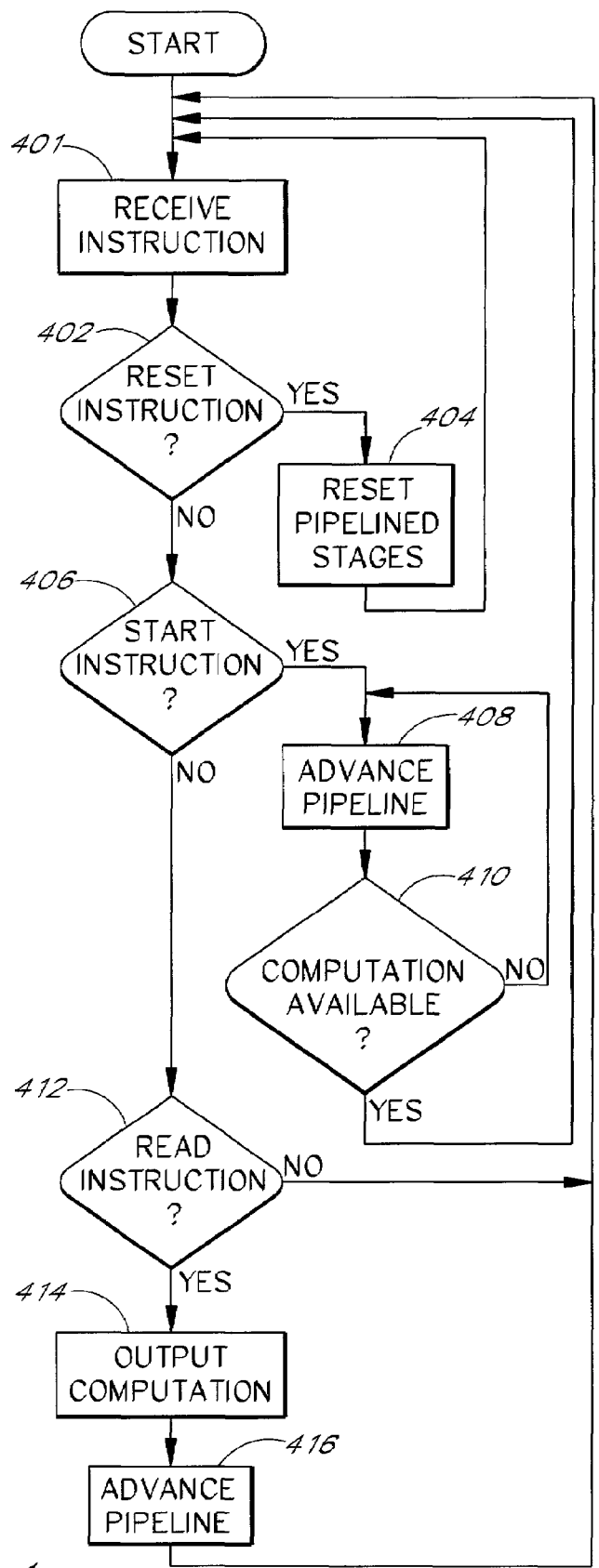
FIG. 4 illustrates a process of pipeline control according to an embodiment of the invention.

FIG. 4 illustrates a process 400 of pipeline control according to an embodiment of the invention. The process advantageously controls a pipelined process, such as a pipelined CORDIC, such that the pipelined process can be easily integrated with a controller, digital signal processor, and the like. The illustrated process starts at a receive instruction step 401. In the receive instruction step 401, the process receives an instruction related to the control of the pipelined process. For example, a microprocessor, microcontroller, digital signal processor, and the like can access the pipelined process by issuing instructions to the pipeline control process. The process advances from the receive instruction step 401 to a reset decision block 402.

In the reset decision block 402, the process determines whether the received instruction corresponds to a command to reset the CORDIC. Where the received instruction is a reset instruction, such as a resetCORDIC instruction, the reset decision block 402 proceeds to a reset step 404. Where the command is other than the reset instruction, the reset decision block 402 proceeds to a start decision block 406.

In the reset step 404, the process resets those circuits in the pipelined process that are calculated. In one embodiment, where the pipelined process is a CORDIC, the reset step 404 resets all the CORDIC stages or butterfly stages. In another embodiment, where the pipelined process is a combination of a lookup table stage and of CORDIC stages, the reset step 404 resets the CORDIC stages or butterfly stages but does not reset the lookup table stage. The process returns from the reset step 404 to the start of the process.

In the start decision block 406, the process determines whether the received instruction corresponds to a start instruction for the pipeline. Typically, a start instruction is applied to a pipelined process when the starting data has changed. One example of an appropriate time to issue a start instruction is where the pipelined process synthesizes a frequency, and the synthesized frequency has changed by updating an amount of an angle increment. When the received instruction is a start instruction, such as a startCORDIC instruction, the process proceeds from the start decision block 406 to a first advance pipeline step 408. When the received instruction is other than the start instruction, the process proceeds from the start decision block 406 to a read decision block 412.

In the first advance pipeline step 408, the process advances data from one stage or segment of the pipelined process to another. For example, a stage or segment can advance data in response to a rising or a falling edge of a clock signal. In one embodiment, the process controls the pulsing of the clock signal used to enable sequencing through the pipelined process. It will be understood by one of ordinary skill in the art that a variety of techniques can be used to control sequencing through the pipelined process, including for example, providing an enable signal as an input to the stages or segments of the pipelined process. The process advances from the first advance pipeline step 408 to a computation available decision block 410.

In the computation available decision block 410, the process determines whether the new computation is available at the end of the pipelined process. That is, the process determines whether data has advanced far enough in the pipelined process to have progressed from the beginning stage or segment to the last stage or segment, i.e., whether the initial latency of the pipelined process has concluded. In one embodiment, the process counts the number of activations of the pipeline sequencing and compares the count to a known count of the number of stages or segments to determine whether the new computation is available at the end of the pipelined process. When the new computation is available, the process returns from the computation available decision block 410 to the start of the process, and awaits the next instruction. When the new computation is not yet available, the process returns from the computation available decision block 410 to the first advance pipeline step 408 to continue to advance data through the pipelined process.

In the read decision block 412, the process determines whether the received instruction corresponds to a command to read data from the pipelined process. When the received instruction is a read instruction, the process proceeds from the read decision block 412 to an output computation step 414. When the received instruction is other than the read instruction, such as a "no operation" instruction, the process returns from the read decision block 412 to the start of the process.

In the output computation step 414, the process enables an output of the pipelined process. For example, when the final data is stored in an output register, the process can enable a tri-stateable gate to couple the contents of the output register on a data bus, where the contents are read by a controller, DSP, MAC, and the like. The process advances from the output computation step 414 to a second advance pipeline step 416.

In the second advance pipeline step 416, the process advances the pipelined process by a single stage or segment, i.e., data moves from one segment to the next segment. In one embodiment, the process advances data in the second advance pipeline step 416 by providing a single clock pulse to the pipelined stages or segments.

The illustrated process repeats indefinitely. The skilled practitioner will appreciate that the reset decision block 402, the start decision block 406, and the read decision block 412 can appear in the process in any order.

Figure 5:
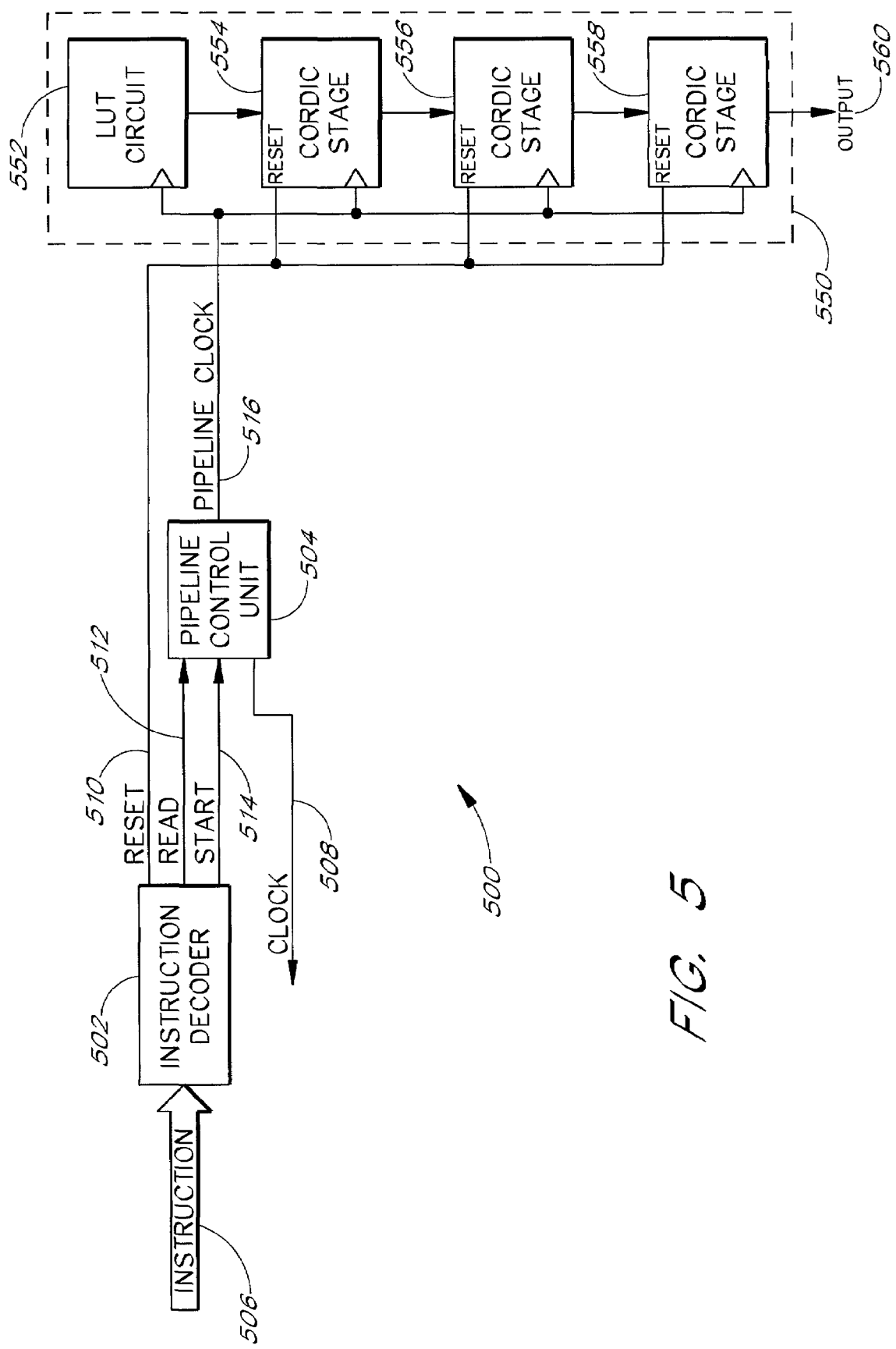
FIG. 5 illustrates a pipeline control circuit according to an embodiment of the invention.

FIG. 5 illustrates a pipeline control circuit 500 according to an embodiment of the invention. The illustrated pipeline control circuit 500 includes an instruction decoder 502 and a pipeline control unit 504. The pipeline control circuit 500 controls the resetting and the progressing of data through the segments of a pipelined circuit, such as a pipelined CORDIC 550. It will be understood by one of ordinary skill in the art that the pipeline control circuit 500 can control a wide variety of pipelined circuits and that the pipelined CORDIC 550 shown in FIG. 5 is illustrative of but one example. Other examples of pipelined circuits include divider circuits, relatively high-precision multiplier circuits such as 64×64, relatively high-precision adder circuits, floating point units, and the like.

The instruction decoder 502 receives instructions 506 from a microprocessor, digital signal processor, state machine, and the like. It will be understood by one of ordinary skill in the art that the instruction decoder 502 can be a part of a larger instruction decoder for a larger circuit such as the Execution Block 100 described earlier in connection with FIG. 1. The illustrated instruction decoder 502 generates a reset signal 510, a read signal 512, and a start signal 514 in response to the instructions 506. In one embodiment, the instruction decoder 502 further includes a select input driven by, for example, an address decoder, that activates the instruction decoder 502.

The reset signal 510 is provided as an input to the pipelined circuit, which is shown in FIG. 5 as the pipelined CORDIC 550. The pipelined CORDIC 550 includes multiple stages or segments. In some pipelined circuits, not all of the segments of the pipeline need to be reset. For the purposes of example, the pipelined CORDIC 550 includes a Lookup Table (LUT) circuit 552 as a first stage, a first CORDIC stage 554 as a second stage, a second CORDIC stage 556 as a third stage, and a third CORDIC stage 558 as a fourth stage. In the pipelined CORDIC 550 shown in FIG. 5, the reset signal 510 is applied as an input to the first CORDIC stage 554, the second CORDIC stage 556, and the third CORDIC stage 558, but not to the LUT circuit 552.

The read signal 512 and the start signal 514 are provided as inputs to the pipeline control unit 504. A clock signal 508 is also provided as an input to the pipeline control unit 504. In response to an activation of the read signal 512, the pipeline control unit 504 activates the pipelined circuit so that data passes from one pipeline stage to another, such as from the first CORDIC stage 554 to the second CORDIC stage 556. In one embodiment, the pipeline control unit 504 activates one pulse of a pipeline clock signal 516 in response to the activation of the read signal 512. The pulse of the pipeline clock signal 516 is applied as an input to the stages of the pipelined circuit, which are activated in response to the pulse. A flip-flop circuit can be used to generate a single pulse on the pipeline clock signal 516 in response to the activation of the read signal 512. In one embodiment, the pipeline control circuit 500 includes a wait state generator that instructs the controller, DSP, MAC, and like devices that reads the output of the pipelined circuit to temporarily wait until the data has propagated through the pipeline and is available to be read.

The pipeline control unit 504 generates a series of pulses in response to an activation of the start signal 514. The pipeline control unit 504 generates at least enough pulses on the pipeline clock signal 516 in response to the activation of the start signal 514 such that data can sequence through each stage of the pipelined circuit and a computation is available to be read at an output 560. In one embodiment, the pipeline control unit 504 generates the same number of pulses on the pipeline clock signal 516 as the number of stages in the pipelined circuit.

A variety of techniques can be used to generate the series of pulses by the pipeline control unit 504. For example, one embodiment of the pipeline control unit 504 includes a counter to track the number of pulses that are applied by the pipeline clock signal 516. The counter can be reset in response to the start signal 514, and the counter can increment to a predetermined count. While the counter is counting, the pipeline control unit 504 provides clock pulses over the pipeline clock signal 516 by, for example, coupling the clock signal 508 to the pipeline clock signal 516.

In another embodiment, a counter is preloaded in response to the start signal 514 and decrements down to zero to track the number of pulses that are applied by the pipeline clock signal 516. While the counter decrementing, the pipeline control unit 504 couples the clock signal 508 to the pipeline clock signal 516 to generate the series of pulses. When the counter counts down to zero, the counter is disabled and the pulsing of the pipeline clock signal 516 stops.

In another embodiment, the stages of the pipelined circuit receive a continuous clock signal such as the clock signal 508, and the pipeline control unit 504 generates control signals that selectively enable and disable the stages of the pipelined circuit by controlling an enable input in the registers of the pipelined circuit.

The pipelined circuits and the pipeline control circuits disclosed herein can be fabricated in a broad variety of ways. In one embodiment, the circuits are integrated into dedicated hardware such as a custom application specific integrated circuit (ASIC), a field programmable gate array (FPGA), a programmable logic device (PLD), and the like. In one embodiment, the pipelined circuits, the pipeline control circuits, or both are integrated with a digital signal processor (DSP) core.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of generating a function in a digital signal processor (DSP), the method comprising:
   receiving a first instruction, where the first instruction initiates a computation according to a Coordinate Rotation Digital Computer (CORDIC) algorithm;
   computing the CORDIC algorithm in a pipeline;
   automatically discontinuing further computations of the CORDIC algorithm in the pipeline when a computed output is ready;
   providing the computed output of the CORDIC algorithm in response to a second instruction;
   predicting a desired time when a computation of the CORDIC algorithm is desired; and
   initiating the computation of the CORDIC algorithm before the desired time such that the computation is completed by the desired time.

2. The method as defined in claim 1, wherein the CORDIC algorithm is initiated before the desired time by an amount of time substantially equal to an initial latency period of the computation.

3. A control circuit for a pipelined Coordinate Rotation Digital Computer (CORDIC) comprising:
   a reset circuit adapted to reset at least a portion of the pipelined stages of the pipelined CORDIC;
   a first sequencing unit adapted to automatically enable clock pulses to the pipelined CORDIC such that a new calculation progress from a beginning of the pipelined CORDIC to an end of the pipelined CORDIC and to automatically disable the automatic application of clock pulses to the pipelined CORDIC when the computation is available at the end of the pipelined CORDIC;
   and a second sequencing unit adapted to provide a clock pulse to the pipelined CORDIC to advance a calculation from one stage to another where the second sequencing unit is configured to provide the clock pulse in response to an instruction to read an output of the pipelined CORDIC, wherein the first sequencing unit comprises a counter that is reset in response to a detection of a start instruction, where the first sequencing unit enables clock pulses when a count maintained by the counter is in a first range of counts, and where the first sequencing unit disables the automatic application of clock pulses when the count maintained by the counter is in a second range of count.

4. The control circuit as defined in claim 3, where the counter is incremented in response to an advancing of data from one pipelined stage to another, and the number of pipelined stages of the pipelined CORDIC determines the count at which the control circuit enables and disables the automatic application of clock pulses to the pipelined CORDIC.

* * * * *